(12) United States Patent
Nishimura et al.

(10) Patent No.: US 10,286,497 B2
(45) Date of Patent: May 14, 2019

(54) LEAD-FREE SOLDER ALLOY

(71) Applicant: NIHON SUPERIOR CO., LTD., Suita-shi, Osaka (JP)

(72) Inventors: Tetsuro Nishimura, Suita (JP); Takatoshi Nishimura, Toyonaka (JP)

(73) Assignee: Nihon Superior Co., Ltd., Suita-shi, Osaka (JP)

( * ) Notice: Subject to any disclaimer, the term of this patent is extended or adjusted under 35 U.S.C. 154(b) by 199 days.

(21) Appl. No.: 14/901,638

(22) PCT Filed: Apr. 28, 2015

(86) PCT No.: PCT/JP2015/062818
§ 371 (c)(1),
(2) Date: Dec. 28, 2015

(87) PCT Pub. No.: WO2015/166945
PCT Pub. Date: Nov. 5, 2015

(65) Prior Publication Data
US 2016/0368102 A1    Dec. 22, 2016

(30) Foreign Application Priority Data

Apr. 30, 2014 (JP) ................. 2014-094277
Jan. 13, 2015 (JP) ................. 2015-004403

(51) Int. Cl.
*C22C 13/00* (2006.01)
*C22C 13/02* (2006.01)
(Continued)

(52) U.S. Cl.
CPC .......... *B23K 35/262* (2013.01); *B23K 1/0016* (2013.01); *B23K 35/26* (2013.01);
(Continued)

(58) Field of Classification Search
CPC ........ B23K 35/262; C22C 13/00; C22C 13/02
See application file for complete search history.

(56) References Cited

U.S. PATENT DOCUMENTS 4,879,096 A † 11/1989 Naton
5,980,822 A    11/1999 Moon et al.
(Continued)

FOREIGN PATENT DOCUMENTS

BY    15065    8/2010
CN    1195592 A    10/1998
(Continued)

OTHER PUBLICATIONS

The third Office Action issued by the Chinese Patent Office dated Jan. 30, 2018, which corresponds to Chinese Applicatoin No. 201580001155.X.
(Continued)

*Primary Examiner* — Scott R Kastler
*Assistant Examiner* — Vanessa T. Luk
(74) *Attorney, Agent, or Firm* — Muncy, Geissler, Olds & Lowe, P.C.

(57) ABSTRACT

Provided is a lead-free solder alloy and soldering capable of maintaining strong joining strength even in a high-temperature state after soldering and having high reliability and versatility. The lead-free solder alloy composition of the present invention has Sn—Cu—Ni as a basic composition, which includes 0.1 to 2.0 mass % of Cu, and 0.01 to 0.5 mass % of Ni, 0.1 to 5 mass % of Bi, and 76.0 to 99.5 mass % of Sn, such that it is possible to implement soldering with high reliability without decreasing joining strength of a soldered joint even in a state of being exposed to high temperature for a long time, as well as joining strength at the time of bonding.

6 Claims, 9 Drawing Sheets

(51) Int. Cl.
  *B23K 35/362* (2006.01)
  *B23K 35/26* (2006.01)
  *H01R 4/02* (2006.01)
  *B23K 1/00* (2006.01)
  *B23K 35/36* (2006.01)
  *B23K 35/02* (2006.01)

(52) U.S. Cl.
  CPC .............. *C22C 13/00* (2013.01); *C22C 13/02* (2013.01); *H01R 4/02* (2013.01); *B23K 35/025* (2013.01); *B23K 35/0244* (2013.01); *B23K 35/362* (2013.01); *B23K 35/3613* (2013.01)

(56) References Cited

U.S. PATENT DOCUMENTS

| | | | |
|---|---|---|---|
| 6,180,055 B1 † | 1/2001 | Tetsuro | |
| 6,365,097 B1 * | 4/2002 | Yamashita | B23K 35/262 420/561 |
| 7,172,726 B2 * | 2/2007 | Ohnishi | B23K 35/262 148/400 |
| 7,472,817 B2 | 1/2009 | Chew et al. | |
| 7,682,468 B2 | 3/2010 | Munekata et al. | |
| 7,861,909 B2 | 1/2011 | Nishimura | |
| 2003/0021718 A1 | 1/2003 | Munekata et al. | |
| 2004/0062679 A1 | 4/2004 | Munekata et al. | |
| 2006/0088439 A1 | 4/2006 | Chew et al. | |
| 2007/0172381 A1 † | 7/2007 | Deram | |
| 2008/0061117 A1 | 3/2008 | Munekata et al. | |
| 2008/0159903 A1 * | 7/2008 | Lewis | C22C 13/00 420/561 |
| 2008/0292492 A1 * | 11/2008 | Ingham | B23K 35/262 420/561 |
| 2010/0297470 A1 | 11/2010 | Munekata et al. | |
| 2011/0089224 A1 | 4/2011 | Ohnishi et al. | |
| 2012/0175020 A1 * | 7/2012 | Imamura | B23K 35/025 148/24 |
| 2013/0327444 A1 * | 12/2013 | Sawamura | B23K 35/025 148/24 |
| 2014/0134042 A1 * | 5/2014 | Chen | B23K 35/262 420/561 |
| 2014/0328719 A1 | 11/2014 | Chen | |
| 2015/0136461 A1 | 5/2015 | Imamura et al. | |
| 2015/0183062 A1 | 7/2015 | Imamura et al. | |
| 2015/0266137 A1 | 9/2015 | Choudhury et al. | |

FOREIGN PATENT DOCUMENTS

| | | | | |
|---|---|---|---|---|
| CN | 101011782 A | | 8/2007 | |
| CN | 101214591 A | | 7/2008 | |
| GB | 2431412 A | * | 4/2007 | ............ C22C 13/00 |
| JP | 2000-190090 | | 7/2000 | |
| JP | 2000-190090 A | | 7/2000 | |
| JP | 2001-334384 | | 12/2001 | |
| JP | 2004-298931 | | 10/2004 | |
| JP | 2006-255762 | | 9/2006 | |
| JP | 2009-131903 A | | 6/2009 | |
| JP | 2011-251310 | | 12/2011 | |
| JP | 2011251310 A | | 12/2011 | |
| JP | 2012-106280 | | 6/2012 | |
| JP | 2013-000744 | | 1/2013 | |
| JP | 2014-008523 | | 1/2014 | |
| JP | 2014-097532 | | 5/2014 | |
| JP | 2014-217888 | | 11/2014 | |
| RU | 2219030 C1 | | 12/2003 | |
| RU | 2254971 C2 | | 6/2005 | |
| RU | 2356975 C2 | | 12/2008 | |
| RU | 2410222 C2 | | 8/2009 | |
| WO | WO 02/40213 A1 | | 5/2002 | |
| WO | WO 2009/13114 | | 10/2009 | |
| WO | WO 2014/003006 A1 | | 1/2014 | |
| WO | WO 2014/057261 A1 | | 4/2014 | |

OTHER PUBLICATIONS

Partial translation of China Electrical Engineering Canon, Mar. 2009, vol. 3, p. 648, China.
Office Action issued by the Russian Patent Office dated Feb. 7, 2018, which corresponds to Russion Applicatoin No. 2016146520..
The Extended European search Report dated Mar. 14, 2018, which corresponds to European Application No. 15785689.9.
Korean Office Action dated Dec. 6, 2018 in corresponding application 10-2016-7033604.
Russian Office Action dated Jan. 24, 2019 in corresponding application 2018118008(028078).
English Abstract of: Jong-min Kim et al: "A Study on Reliability Assessment of Ag-free Solder"; Samsung Electro-Mechanics; Departments of Industrial Engineering, Ajou University. (2013).

\* cited by examiner
† cited by third party

LEAD-FREE SOLDER ALLOY

This application is the national phase under 35 U.S.C. § 371 of PCT International Application No. PCT/JP2015/062818 which has an International filing date of Apr. 28, 2015 and which claims priority to JP Application No.: 2014-094277, which was filed on Apr. 30, 2014 and to JP Application No.: 2015-004403, which was filed on Jan. 13, 2015, and which are all incorporated herein by reference.

BACKGROUND

1. Technical Field

The present invention relates to a lead-free solder alloy having less deterioration over time and excellent long-term reliability, and a solder joint using the solder alloy.

2. Description of Related Art

In order to reduce the global environmental load, a lead-free solder has been widely distributed as a bonding material of electronic components, and a Sn—Ag—Cu system solder alloy or a Sn—Cu—Ni system solder alloy is a representative composition thereof.

Recently, in addition to the Sn—Ag—Cu system solder alloy and the Sn—Cu—Ni system solder alloy, a lead-free solder alloy in which Bi, In or Sb, etc. is added and a lead-free solder alloy such as a Sn—Zn solder alloy, in accordance with soldering purpose and soldering characteristics have been proposed.

In particular, the lead-free solder alloy in which Bi, Sb or In is added for the purpose of increasing mechanical strength of soldered joints or decreasing solidus temperature, is disclosed.

For example, Japanese Patent Laid-open Publication No. 2001-334384 discloses a lead-free solder alloy allowing the melting point of solder to be easily controlled by adding 0.01 to 3 wt % of Bi to a basic composition of Sn—Cu—Ni.

In addition, Japanese Patent Laid-open Publication No. 2004-298931 discloses a lead-free solder alloy having improved mechanical strength by adding Bi to a basic composition of Sn—Cu—Sb in a proportion of 1 wt % or less.

Further, Japanese Patent Laid-open Publication No. 2006-255762 discloses a lead-free solder alloy having effects of increasing adhesive strength and decreasing the solidus temperature by adding 0.001 to 5 wt % of Cu, Ni and Bi to Sn.

Further, the applicant discloses, in Japanese Patent Laid-open Publication No. 2013-744, a lead-free solder alloy exhibiting strong joining strength at the time of soldering by forming an intermetallic compound having a hexagonal close-packed structure at a soldered joint and its joining interface, by adding a prescribed amount of Ni and Cu to a Sn—Bi eutectic composition.

However, the techniques disclosed in Japanese Patent Laid-open Publication No. 2001-334384, Japanese Patent Laid-open Publication No. 2004-298931, Japanese Patent Laid-open Publication No. 2006-255762, and Japanese Patent Laid-open Publication No. 2013-744 also have problems to be solved. For example, the solder alloy composition disclosed in Japanese Patent Laid-open Publication No. 2001-334384 requires 2 to 5 wt % of blending amount of Cu, and a soldering temperature exceeding 400° C. which is a temperature of at least 150° C. higher than that of the Sn—Ag—Cu system solder alloy or Sn—Cu—Ni system solder alloy which is a representative lead-free solder composition.

Further, in the solder alloy composition disclosed in Japanese Patent Laid-open Publication No. 2004-298931, 10 wt % or more of Sb is blended to the basic composition thereof, such that the solidus temperature is 230° C. or higher as described in the example, and as in Japanese Patent Laid-open Publication No. 2001-334384, it is necessary to perform a soldering process at a higher temperature, as compared to a conventional representative lead-free solder composition.

Further, the technique disclosed in Japanese Patent Laid-open Publication No. 2006-255762 is not a solder alloy composition capable of being applied to various solder bonding, but a solder alloy composition limited to super fine wire solder, and thus has problems regarding versatility.

Meanwhile, the technique disclosed in Japanese Patent Laid-open Publication No. 2013-744 is a technique for the purpose of providing strong joining by forming an intermetallic compound having a NiAs-type crystal structure in a joining interface, in which a blending ratio of Sn and Bi is Sn:Bi=76 to 37 atomic wt %:23 to 63 atomic wt %, and the technique is directed to a composition in the vicinity of eutectic.

Furthermore, Publication WO 2009/131114 discloses a technique relating to a solder alloy composition which is adapted to prevent an occurrence of tin pest at an extremely low temperature, and includes Sn—Cu—Ni—Bi having good wettability and impact resistance. For the purpose of the corresponding invention, the composition has numerical values limited to a range that a blending amount of Cu is 0.5 to 0.8 mass %, a blending amount of Ni is 0.02 to 0.04 mass %, and a blending amount of Bi is 0.1 mass % or more and less than 1 mass %.

In general, when an electronic device is being used, a soldered joint of the electronic device is in a conducting state, and in some cases, the solder bonding part may be exposed to high temperature.

Herein, in terms of reliability of the solder bonding, a bonding strength when the solder bonding part is exposed to high temperature becomes very important, as well as the bonding strength at the time of the soldering.

Meanwhile, the techniques disclosed in Japanese Patent Laid-open Publication No. 2001-334384, Japanese Patent Laid-open Publication No. 2004-298931, Japanese Patent Laid-open Publication No. 2006-255762, Japanese Patent Laid-open Publication No. 2013-744, and Publication WO 2009/131114 do not teach any content concerning the bonding strength when the soldered joint is exposed to high temperature for a long time.

Further, a lead-free solder alloy enabling soldering with high reliability which is enough to withstand long-term use of the electronic device, and having versatility with respect to the solder bonding is required.

SUMMARY

An object of the present invention is to provide a lead-free solder alloy and a soldered joint capable of maintaining strong joining strength without reducing the bonding strength even in a high-temperature state after soldering, and having high reliability and versatility.

The present inventors focused on a lead-free solder alloy composition and an intermetallic compound, and have repeatedly conducted intensive study for the above-described object. As a result, they have found that, by adding a specific amount of Bi to a lead-free solder alloy having Sn—Cu—Ni as a basic composition, a decrease in the bonding strength is suppressed even when a solder bonding part is exposed to high temperature, and thereby the present invention has been completed on the basis of the above finding.

That is, the present invention provides a lead-free solder alloy composition having Sn—Cu—Ni as a basic composition, including 76.0 to 99.5 mass % of Sn, 0.1 to 2.0 mass % of Cu, and 0.01 to 0.5 mass % of Ni, and further including 0.1 to 5.0 mass % of Bi, thereby enabling soldering with high reliability which maintains joining strength without decreasing the bonding strength of a soldered joint even when it is exposed to high temperature for a long time, as well as at the time of bonding.

The lead-free solder alloy according to the present invention has versatility which is not limited by a method of using a solder product or a shape thereof, and even when the soldered joint is exposed to a high-temperature state for a long time, the joining strength will not decrease. Therefore, the lead-free solder alloy can be widely applied to a device having a solder bonding part in which high current flows, a device which is exposed to a high-temperature state, or the like, as well as the joining of an electronic device.

The above and further objects and features will move fully be apparent from the following detailed description with accompanying drawings.

BRIEF DESCRIPTION OF THE SEVERAL VIEWS OF THE DRAWINGS

FIG. 7 is a graph summarizing measurement results of tensile strength of samples having different additional amounts of In.

DETAILED DESCRIPTION

Hereinafter, the present invention will be described in detail.

Conventionally, the joining strength at the time of soldering has been an important item for soldering of electronic devices, or the like, and the solder alloy capable of improving the joining strength at the time of soldering has been developed and provided.

However, soldered joints used in electronic devices or the like can be frequently exposed to high temperature or in a state in which current flows, especially during using the electronic device, and in some cases, an increase in temperature of the soldered joints may be accelerated by the external environment. Therefore, in order to improve the reliability of the soldered joints, it is required to suppress deterioration over time of the soldered joints which is exposed to a high-temperature state.

Meanwhile, as a method for evaluating the soldered joints, a method of using a test referred to as a thermal cycling test wherein a soldered joint is repeatedly left in a high-temperature state and a low-temperature state for a prescribed time is generally used. However, it is also known that in the method, since the soldered joints is left in a high-temperature state and then left in a low-temperature state for a prescribed time, a condition of the soldered joints after the test is different from that of an aging test in which the soldered joints is left only in a high-temperature state for a long time.

The present invention relates to a solder alloy composition capable of suppressing a decrease in joining strength of a soldered joint due to continuously exposing the soldered joints in a high-temperature state, that is, an environment which is an example of a situation according to actual state of using electronic devices.

In particular, the present invention relates to a lead-free solder alloy which may include 76.0 to 99.5 mass % of Sn, 0.1 to 2.0 mass % of Cu, 0.01 to 0.5 mass % of Ni, and 0.1 to 5.0 mass % of Bi, and a soldered joint using the lead-free solder alloy.

Further, it is also possible to add one or two or more elements selected from 0.1 to 5.0 mass % of Sb, 0.1 to 10.0 mass % of In, 0.001 to 1.0 mass % of Ge, and 0.001 to 1.0 mass % of Ga to a basic composition including 76.0 to 99.5 mass % of Sn, 0.1 to 2.0 mass % of Cu, 0.01 to 0.5 mass % of Ni, and 0.1 to 5.0 mass % of Bi.

In addition, an element such as P, Co, Al, Ti, Ag, etc., may also be arbitrarily added to the lead-free solder alloy having Sn—Cu—Ni—Bi as the basic composition thereof of the present invention, in a range in which the effects of the present invention are obtained.

A synergy effect of increasing mechanical strength of the soldered joints is expected while achieving the effects of the present invention by adding Sb to the solder alloy having the Sn—Cu—Ni—Bi as the basic composition thereof.

Further, when adding In, even if Cu or Sb is blended to the solder alloy in an amount of exceeding 1 mass %, an effect of decreasing solidus temperature may be obtained, while achieving the effects of the present invention, and an effect of decreasing a load applied to electronic components joined to electronic devices, soldering work, or the like may be expected.

Further, when adding Ge or Ga, it is possible to suppress oxidation of the soldered joint and improve wettability, and a synergy effect of improving long-term reliability and soldering characteristics of the soldered joint may also be expected, while achieving the effects of the present invention.

Next, effects of the present invention will be described by illustrating an experimental example.

An aging test to be described below was performed on the lead-free solder alloy of the present invention and its properties was evaluated.

[Aging Test]

(Method)

1) A solder alloy having a composition shown in Table 1 was prepared and melted, and then cast into a dog boneshaped mold having a cross section of 10 mm×10 mm, thereby preparing a sample for measurement.

2) The measurement sample was left at 150° C. for 500 hours to perform aging processing.

3) The samples on which the aging processing was performed and the samples on which the aging processing was not performed are pulled until they are cut using a testing machine, AG-IS (manufactured by Shimadzu Corp.) under a condition of 10 mm/min at room temperature (20° C. to 25° C.), thereby measuring tensile strength of the samples.

(Result)

Figure 1:
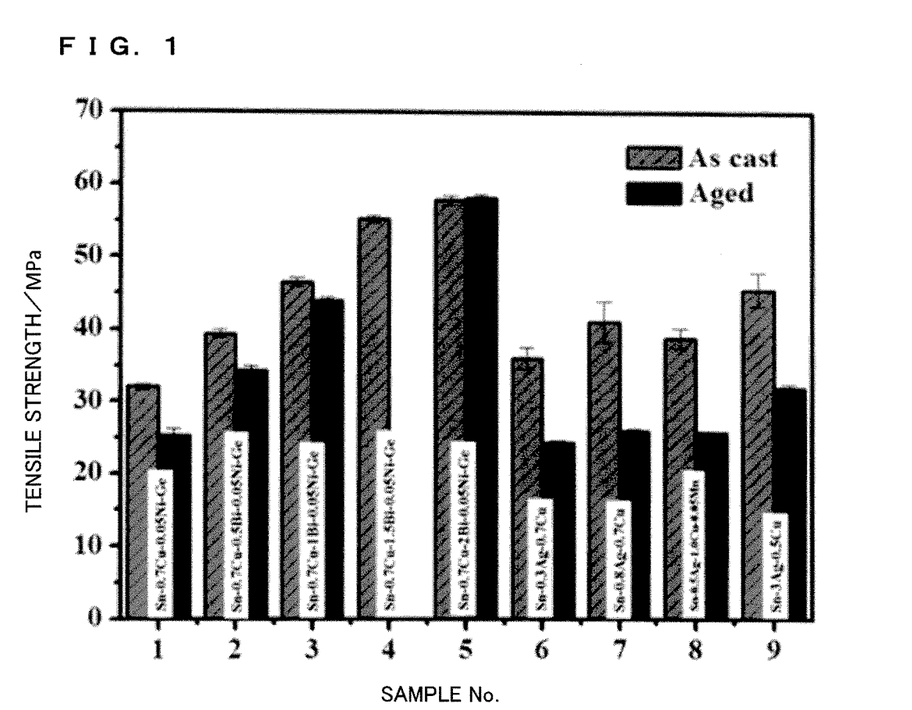
FIG. 1 is a graph illustrating an experimental result.

Measured results are illustrated in FIG. 1.

Table 2 is a composition table showing compositions of the samples used in the measurement of the tensile strength.

As a Comparative Example (Sample i: Sample name is SN2), a composition of Sn—Cu—Ni to which Bi is not blended is contained. Further, the samples including Bi are referred to as Sample ii "Sample name: +0.1Bi*," Sample iii "Sample name: +0.5Bi*," Sample iv "Sample name: +1.0Bi*," Sample v "Sample name: +1.5Bi*," Sample vi "Sample name: +2.0Bi*," Sample vii "Sample name: +3.0Bi*," Sample viii "Sample name: +4.0Bi*," Sample ix "Sample name: +5.0Bi*," and Sample x "Sample name: +6.0Bi*." In Samples ii to x, Bi is included in an amount of

TABLE 1

| Sample No. | Compositions (wt %) | Element (wt %) | | | | | | | |
|---|---|---|---|---|---|---|---|---|---|
| | | Bn | Cu | Ni | Bi | Ge | Ag | In | Mn |
| 1 | Sn—0.7Cu—0.05Ni—Ge | Balance | 0.7 | 0.05 | — | 0.007 | — | — | — |
| 2 | Sn—0.7Cu—0.05Ni—0.5Bi—Ge | Balance | 0.7 | 0.05 | 0.5 | 0.007 | — | — | — |
| 3 | Sn—0.7Cu—0.05Ni—1.0Bi—Ge | Balance | 0.7 | 0.05 | 1.0 | 0.006 | — | — | — |
| 4 | Sn—0.7Cu—0.05Ni—1.5Bi—Ge | Balance | 0.7 | 0.05 | 1.5 | 0.006 | — | — | — |
| 5 | Sn—0.7Cu—0.05Ni—2.0Bi—Ge | Balance | 0.7 | 0.05 | 2.0 | 0.006 | — | — | — |
| 6 | Sn—0.7Cu—0.3Ag | Balance | 0.7 | — | — | — | 0.3 | — | — |
| 7 | Sn—0.7Cu—0.8Ag | Balance | 0.7 | — | — | — | 0.8 | — | — |
| 8 | Sn—1.0Cu—0.5Ag—0.05Mn | Balance | 1.0 | — | — | — | 0.5 | — | 0.008 |
| 9 | Sn—0.5Cu—3.0Ag | Balance | 0.5 | — | — | — | 3.0 | — | — |

The graph illustrated in FIG. 1 illustrates the measurement results of the samples in which the aging processing was not performed on the left side, and the measurement results of the samples in which the aging processing was performed on the right side, respectively.

The samples of the present invention correspond to No. 2 to 5, and it can be appreciated that the tensile strength of the sample in which the aging processing was performed is not much decreased as compared to that of the sample in which the aging processing was not performed.

Whereas, sample No. 1 and samples No. 6 to 9 which are comparative samples show a remarkable decrease in tensile strength of the sample in which the aging processing was performed as compared to the sample in which the aging processing was not performed.

From the results, it could be clearly appreciated that even though the lead-free solder alloy having Sn—Cu—Ni—Bi as the basic composition of the present invention was exposed to high temperature of 150° C. for 500 hours, the decrease in the tensile strength thereof was suppressed as compared to other lead-free solder alloy compositions.

Hereinafter, with regard to the basic composition of Sn—Cu—Ni—Bi, a change in tensile strength resulting from a change in an additional amount of Bi will be described in detail. In more detail, it will be described based on the measurement result of a change in tensile strength of samples in which 0 mass % to 6 mass % of Bi are added to such composition.

0.1 mass %, 0.5 mass %, 1.0 mass %, 1.5 mass %, 2.0 mass %, 3.0 mass %, 4.0 mass %, 5.0 mass %, and 6.0 mass %, respectively.

Samples i to x having the compositions in Table 2 were prepared by the above described Aging Test method. Subsequently, the aging processing was performed on the samples at 150° C. for 0 hours and 500 hours, and the tensile strength thereof was measured.

TABLE 2

| SAMPLE No | SAMPLE NAME | Element (wt %) | | | |
|---|---|---|---|---|---|
| | | Sn | Cu | Ni | Bi |
| SAMPLE i | SN2 | Balance | 0.7 | 0.05 | 0 |
| SAMPLE ii | +0.1Bi* | Balance | 0.7 | 0.05 | 0.1 |
| SAMPLE iii | +0.5Bi* | Balance | 0.7 | 0.05 | 0.5 |
| SAMPLE iv | +1.0Bi* | Balance | 0.7 | 0.05 | 1.0 |
| SAMPLE v | +1.5Bi* | Balance | 0.7 | 0.05 | 1.5 |
| SAMPLE vi | +2.0Bi* | Balance | 0.7 | 0.05 | 2.0 |
| SAMPLE vii | +3.0Bi* | Balance | 0.7 | 0.05 | 3.0 |
| SAMPLE viii | +4.0Bi* | Balance | 0.7 | 0.05 | 4.0 |
| SAMPLE ix | +5.0Bi* | Balance | 0.7 | 0.05 | 5.0 |
| SAMPLE x | +6.0Bi* | Balance | 0.7 | 0.05 | 6.0 |

TABLE 3

| A (0 HOURS) | SAMPLE No. | i | ii | iii | iv | v | vi | vii | viii | ix | x |
|---|---|---|---|---|---|---|---|---|---|---|---|
| | SAMPLE NAME | SN2 | +0.1Bi* | +0.5Bi* | +1.0Bi* | +1.5Bi* | +2.0Bi* | +3.0Bi* | +4.0Bi* | +5.0Bi* | +6.0Bi* |
| | MEASUREMENT RESULT (Mpa) | 32.0 | 33.0 | 40.0 | 47.0 | 51.5 | 58.9 | 68.0 | 78.1 | 81.5 | 87.0 |
| C (500 HOURS) | SAMPLE No. | i | ii | iii | iv | v | vi | vii | viii | ix | x |
| | SAMPLE NAME | SN2 | +0.1Bi* | +0.5Bi* | +1.0Bi* | +1.5Bi* | +2.0Bi* | +3.0Bi* | +4.0Bi* | +5.0Bi* | +6.0Bi* |

TABLE 3-continued

|  |  |  |  |  |  |  |  |  |  |  |
|---|---|---|---|---|---|---|---|---|---|---|
|  | MEASUREMENT RESULT (Mpa) | 27.2 | 30.2 | 36.7 | 46.2 | 52.6 | 60.0 | 69.1 | 74.9 | 71.8 | 62.5 |
| STRENGTH CHANGE RATE(C/A) | (%) |  | 85.0% | 91.5% | 91.8% | 98.3% | 102.1% | 101.9% | 101.6% | 95.9% | 88.1% | 71.8% |

Figure 2:
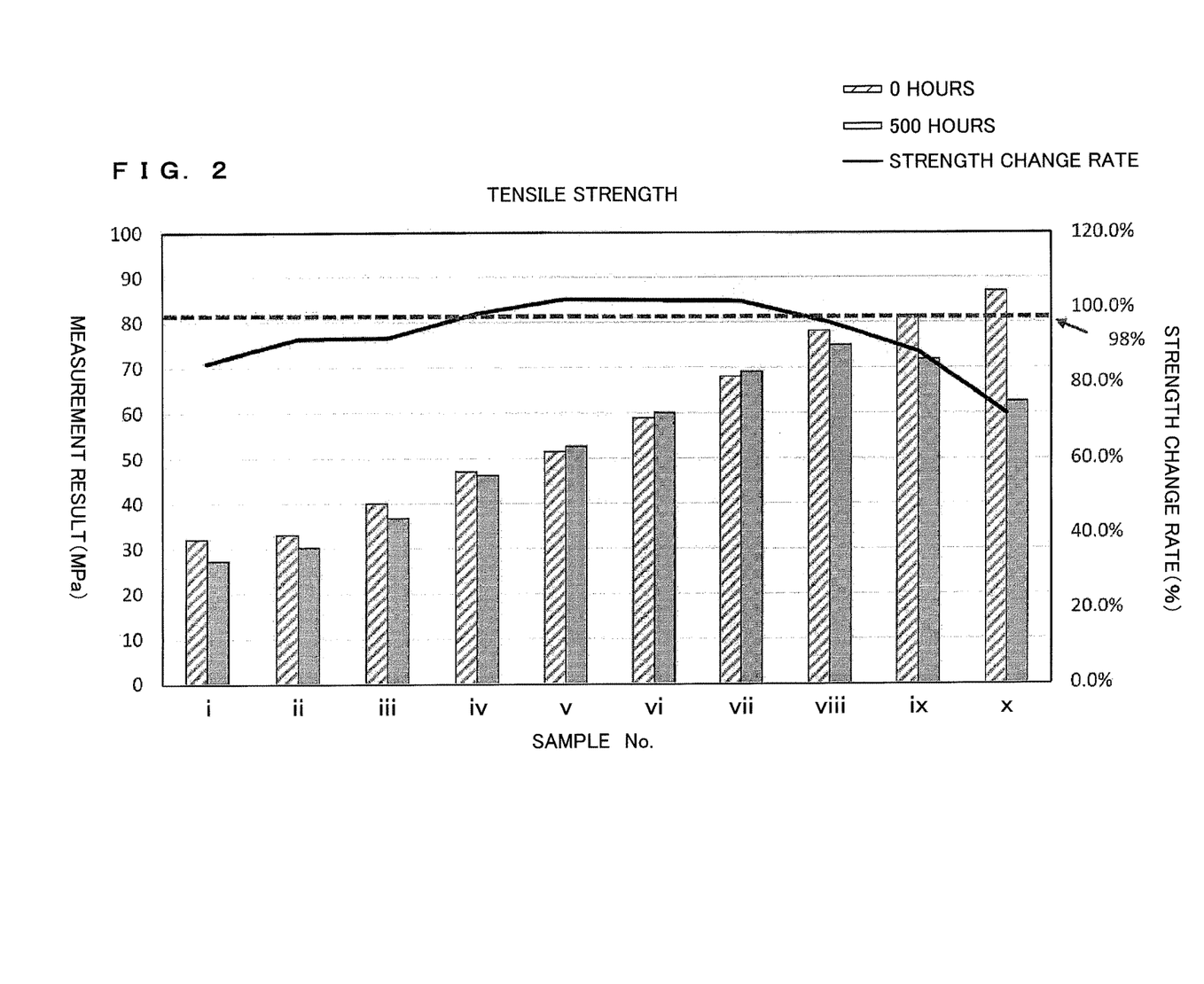
FIG. 2 is a graph summarizing measurement results of tensile strength of each sample having a composition of Table 2.

Table 3 is a table showing measurement results of Samples i to x. "A" of Table 3 is a measurement result of the tensile strength after the aging for 0 hours, and "C" of Table 3 is a measurement result of the tensile strength after the aging for 500 hours, and the strength change rate is a result obtained by measuring a change in the tensile strength after the aging for 500 hours while considering "A" (0 hours) as 100%. Further, FIG. 2 is a graph summarizing the measurement results of the tensile strength of Samples i to x.

With respect to the aging processing time of 0 hours and 500 hours, it can be appreciated that Samples ii to x in which Bi is added have higher tensile strength than that of Sample i in which Bi is not added.

Further, in the case of the aging processing for 500 hours, Samples ii to x in which an additional amount of Bi is 0.1 mass % or more show higher tensile strength than Sample i in which Bi is not added. In addition, Samples iv to vii in which an additional amount of Bi is 1.0 mass % to 3.0 mass % show a strength change rate of 98% or higher. It is appreciated that change rate of the tensile strength after the aging for 500 hours is significantly low and particularly, the tensile strength after the aging for 500 hours of samples v to vii are more improved than the case in which the aging processing is not performed.

Meanwhile, Sample x in which an additional amount of Bi is 6 mass % shows a change rate of the tensile strength of 71.8% which is lower than 85.2% of Sample i in which Bi is not added, thus it can be said that 6 mass % is not a preferable blending amount.

Further, with respect to a case of adding Ge to the basic composition of Sn—Cu—Ni—Bi, a change in the tensile strength resulting from a change in an additional amount of Bi will be described in detail. More specifically, a change in the tensile strength of the samples in which Bi is added to such composition in an amount of 0 to 6 mass % was measured.

Figure 3:
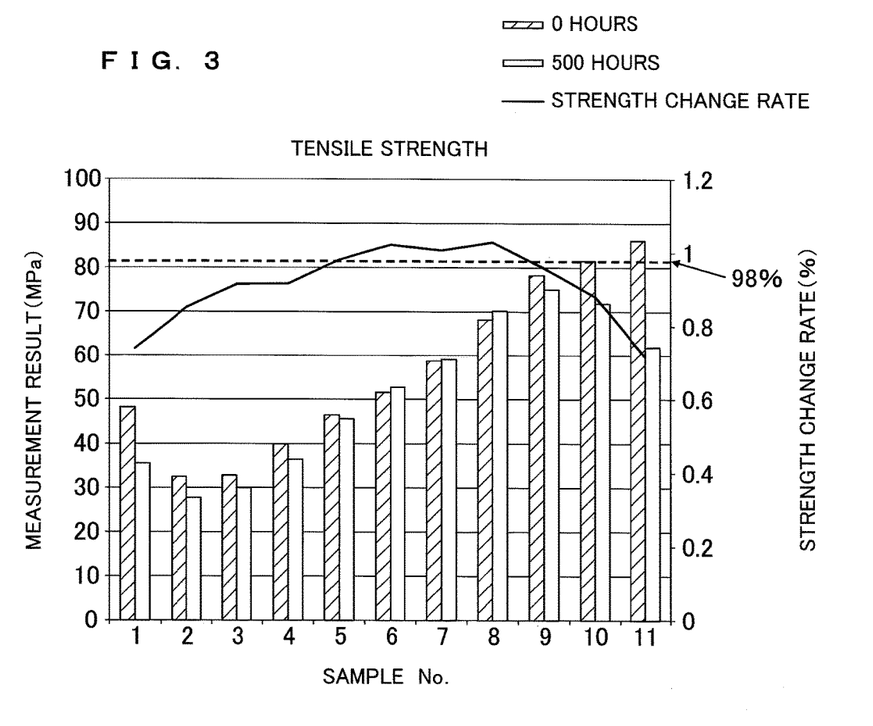
FIG. 3 is a graph summarizing measurement results of tensile strength of each sample having a composition of Table 4.

Table 4 is a composition table showing compositions of the samples used in the measurement of the tensile strength. As illustrated in FIG. 3, Bi is not included in Sample 1 "SAC305" and Sample 2 "SN1." And in Sample 3 "+0.1Bi," Sample 4 "+0.5Bi," Sample 5 "+1.0Bi," Sample 6 "+1.5Bi," Sample 7 "+2.0Bi," Sample 8 "+3.0Bi," Sample 9 "+4.0Bi," Sample 10 "+5.0Bi," and Sample 11 "+6.0Bi," Bi is included in an amount of 0.1 mass %, 0.5 mass %, 1 mass %, 1.5 mass %, 2 mass %, 3 mass %, 4 mass %, 5 mass %, and 6 mass %, respectively.

Further, in all the samples except for Sample 1 "SAC305," 0.7 mass % of Cu, 0.05 mass % of Ni, and 0.006 mass % of Ge are included, and the remainder is Sn. In addition, in Sample 1 "SAC305," 3 mass % of Ag and 0.5 mass % of Cu are included, and the remainder is Sn.

Hereinafter, for convenience of explanation, Sample 1 "SAC305," Sample 2 "SN1," Sample 3 "+10.1Bi," Sample 4 "+0.5Bi," Sample 5 "+1.0Bi," Sample 6 "+1.5Bi," Sample 7 "+2.0Bi," Sample 8 "+3.0Bi," Sample 9 "+4.0Bi," Sample 10 "+5.0Bi," and Sample 11 "+6.0Bi" will be referred to as "Sample 1," "Sample 2," "Sample 3," "Sample 4," "Sample 5," "Sample 6," "Sample 7," "Sample 8," "Sample 9," "Sample 10," and "Sample 11," respectively.

TABLE 4

| SAMPLE |  | Element(wt %) |  |  |  |  |  |
|---|---|---|---|---|---|---|---|
| No | NAME | Sn | Ag | Cu | Ni | Ge | Bi |
| SAMPLE 1 | SNC305 | Balance | 3 | 0.5 | 0 | 0 | 0 |
| SAMPLE 2 | SN1 | Balance | 0 | 0.7 | 0.05 | 0.006 | 0 |
| SAMPLE 3 | +0.1Bi | Balance | 0 | 0.7 | 0.05 | 0.006 | 0.1 |
| SAMPLE 4 | +0.5Bi | Balance | 0 | 0.7 | 0.05 | 0.006 | 0.5 |
| SAMPLE 5 | +1.0Bi | Balance | 0 | 0.7 | 0.05 | 0.006 | 1 |
| SAMPLE 6 | +1.5Bi | Balance | 0 | 0.7 | 0.05 | 0.006 | 1.5 |
| SAMPLE 7 | +2.0Bi | Balance | 0 | 0.7 | 0.05 | 0.006 | 2 |
| SAMPLE 8 | +3.0Bi | Balance | 0 | 0.7 | 0.05 | 0.006 | 3 |
| SAMPLE 9 | +4.0Bi | Balance | 0 | 0.7 | 0.05 | 0.006 | 4 |
| SAMPLE 10 | +5.0Bi | Balance | 0 | 0.7 | 0.05 | 0.006 | 5 |
| SAMPLE 11 | +6.0Bi | Balance | 0 | 0.7 | 0.05 | 0.006 | 6 |

Samples 1 to 11 having compositions as shown in Table 4 were prepared by the above described method. The aging processing was performed on the prepared Samples 1 to 11 for 0 hours and 500 hours at 150° C., and the tensile strength was measured by the above described method.

TABLE 5

| A (0 HOURS) | SAMPLE No. | 1 | 2 | 3 | 4 | 5 | 6 | 7 | 8 | 9 | 10 | 11 |
|---|---|---|---|---|---|---|---|---|---|---|---|---|
|  | SAMPLE NAME | SNC305 | SN1 | +0.1Bi | +0.5Bi | +1.0Bi | +1.5Bi | +2.0Bi | +3.0Bi | +4.0Bi | +5.0Bi | +6.0Bi |
|  | MEASUREMENT RESULT (Mpa) | 48.2 | 32.5 | 32.8 | 39.9 | 46.5 | 51.6 | 58.7 | 68.2 | 78.3 | 81.6 | 86.1 |
| C (500 HOURS) | SAMPLE No. | 1 | 2 | 3 | 4 | 5 | 6 | 7 | 8 | 9 | 10 | 11 |
|  | SAMPLE NAME | SNC305 | SN1 | +0.1Bi | +0.5Bi | +1.0Bi | +1.5Bi | +2.0Bi | +3.0Bi | +4.0Bi | +5.0Bi | +6.0Bi |
|  | MEASUREMENT RESULT (Mpa) | 35.6 | 27.7 | 30 | 36.5 | 45.6 | 52.7 | 59.1 | 70.2 | 75.1 | 71.9 | 61.8 |
| STRENGTH CHANGE RATE (C/A) | (%) | 73.9% | 85.2% | 91.5% | 91.6% | 98.2% | 102.2% | 100.7% | 102.9% | 95.9% | 88.1% | 71.8% |

Table 5 is a table showing measurement results of Samples 1 to 11. "A" of Table 5 is a measurement result of the tensile strength after the aging for 0 hours, and "C" of Table 5 is a measurement result of tensile strength after the aging for 500 hours, and the strength change rate is a result showing a change in the tensile strength after the aging for 500 hours in percentage (%). Further, FIG. 3 is a graph summarizing the measurement results of the tensile strength of Samples 1 to 11.

With respect to the aging processing time of 0 hours and 500 hours, it can be appreciated that Samples 3 to 11 in which Bi is added have higher tensile strength than that of Sample 2 in which Bi is not added.

Further, in the case of the aging processing for 500 hours, Samples 4 to 11 in which an additional amount of Bi is 0.5 mass % or more show higher tensile strength than that of Sample 1 in which Bi is not added and Ag is added. In addition, it can be appreciated that Samples 5 to 8 in which an additional amount of Bi is 1.0 mass % to 3.0 mass % show a strength change rate of 98% or higher, which is a significantly low change rate of the tensile strength after the aging for 500 hours.

Accordingly, in the case of Samples 4 to 11, since Ag is not used, it is possible to achieve cost decrease while having the effect of improving the tensile strength.

Further, it can be appreciated that in the case of Samples 3 to 9, that is, as an additional amount of Bi is increased from 0.1 mass % to 4 mass %, the tensile strength was increased. In addition, in such a range of the additional amount of Bi, there is no large difference between the tensile strength of the case in which the aging processing was not performed and the tensile strength of the case in which the aging processing was performed for 500 hours.

Meanwhile, in the case of Samples 10 and 11 in which an additional amount of Bi is 5 mass % or more, as the additional amount of Bi increased, the tensile strength of the case in which the aging processing was not performed is increased, but the strength change rate tended to be decreased, in particular, in the case of 6 mass %, a change rate of the tensile strength is 71.8% which is lower than 85.2% of the case in which Bi is not added (Sample 2), and thus it may be said that 6 mass % is not a preferable blending amount.

As may be appreciated from the above measurement results, when the lead-free solder alloy consisting of Sn, Cu, Ni, Bi, and Ge is exposed to a harsh usage environment, that is, high temperature of 150° C. for a long time, it is preferable that an additional amount of Bi is 0.5 to 4.0 mass %, and more preferably, 1.0 to 3.0 mass %. In such a range of the additional amount of Bi, as described above, even when the aging processing is performed for 500 hours, high tensile strength may be obtained. Further, there is no large difference between the tensile strength of the case in which the aging processing is not performed and the tensile strength of the case in which the aging processing is performed for 500 hours, that is, a stable tensile strength can be obtained.

Furthermore, in the case of Sample 10 in which an additional amount of Bi is 5 mass %, the tensile strength after the aging processing was lower than the tensile strength of the case in which the aging processing was not performed, as described above. However, since the tensile strength of Samples 1 and 2 in which Bi is not added are lower than that of Sample 10 after the aging process was performed, the additional amount of Bi may be 0.1 to 5.0 mass %.

Further, hereinafter, with regard to a case of adding Ge to the basic composition of Sn—Cu—Ni—Bi, a change in the tensile strength resulting from a change in an additional amount of Cu will be described in detail.

In this case, Ni, Bi, and Ge are included in an amount of 0.05 mass %, 1.5 mass %, and 0.006 mass %, respectively. Further, Cu is added in an amount of 0.05 to 2.2 mass %, and the remainder is Sn. Hereinafter, for convenience of explanation, a sample in which 0.05 mass % of Cu is added, a sample in which 0.1 mass % of Cu is added, a sample in which 0.7 mass % of Cu is added, a sample in which 2 mass % of Cu is added, and a sample in which 2.2 mass % of Cu is added will be referred to as "0.05Cu," "0.1Cu," "0.7Cu," "2Cu," and "2.2Cu," respectively.

The samples were prepared by the above described method and the aging processing was performed on the prepared samples at 150° C. for 0 hours and 500 hours, and the tensile strength thereof was measured by the above described method.

TABLE 6

| A (0 HOURS) | SAMPLE NAME | 0.05Cu | 0.1Cu | 0.7Cu | 2Cu | 2.2Cu |
|---|---|---|---|---|---|---|
| | MEASUREMENT RESULT (Mpa) | 46.4 | 46.6 | 51.6 | 61.2 | 60.2 |
| C (500 HOURS) | SAMPLE NAME | 0.05Cu | 0.1Cu | 0.7Cu | 2Cu | 2.2Cu |
| | MEASUREMENT RESULT (Mpa) | 44.7 | 45.4 | 52.7 | 60.9 | 57.6 |
| STRENGTH CHANGE RATE (C/A) | (%) | 96% | 97% | 102% | 100% | 96% |

Figure 4:
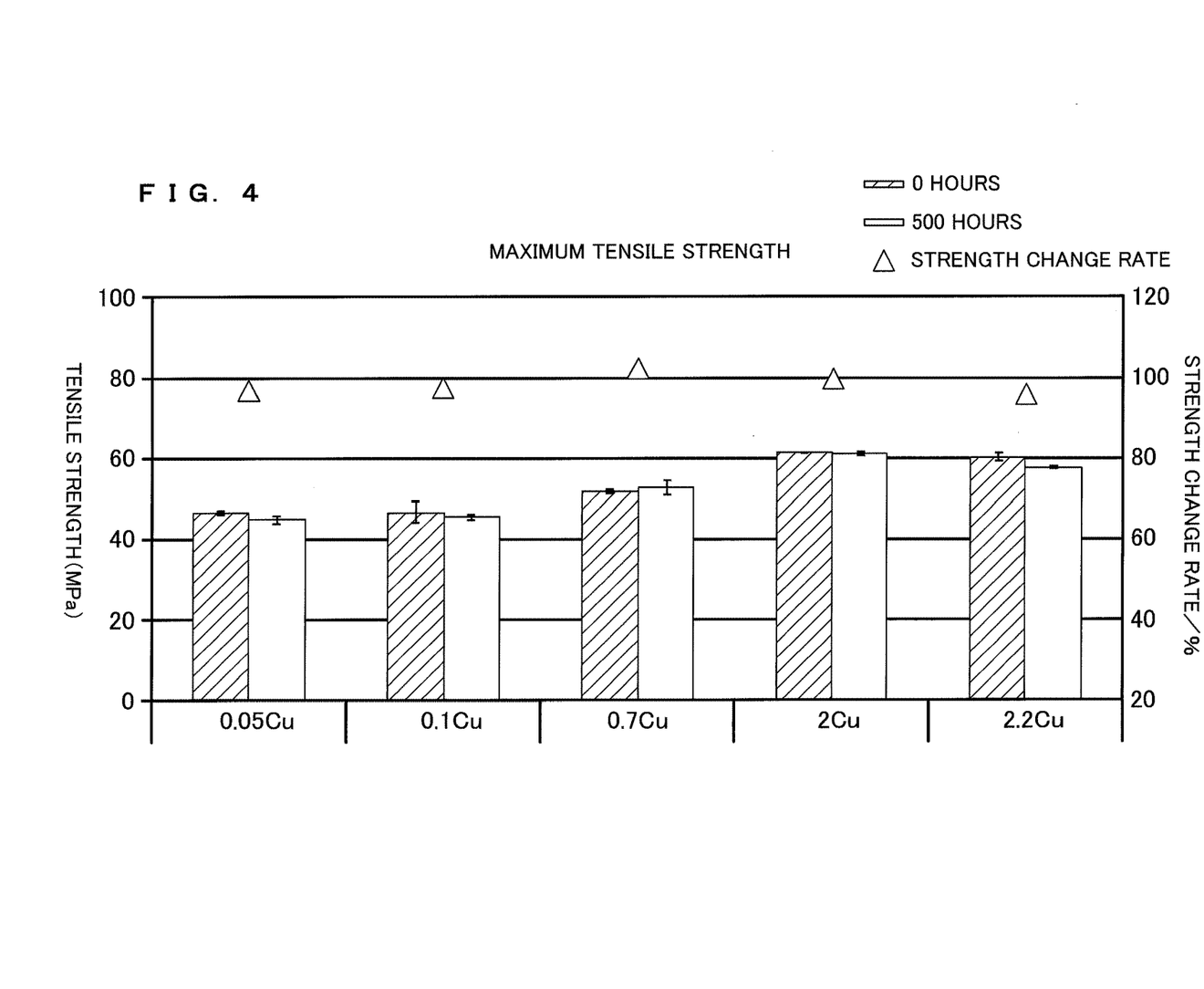
FIG. 4 is a graph summarizing measurement results of tensile strength of samples having different additional amounts of Cu.

Table 6 is a table showing measurement results of the tensile strength of the samples having different additional amounts of Cu as described above. "A" of Table 6 is a measurement result of the tensile strength after the aging for 0 hours, and "C" of Table 6 is a measurement result of the tensile strength after the aging for 500 hours. Further, FIG. 4 is a graph summarizing the measurement results of the tensile strength of the samples having different additional amounts of Cu.

All of "0.05Cu" to "2.2Cu" have a desirable strength change rate higher than 90% before and after the aging. However, since problems such as an increase in so-called Cu leaching may occur, it is not preferable that an additional amount of Cu is 0.05 mass %. Meanwhile, since problems such as a rise in liquid phase temperature, an occurrence of shrinkage cavity, or the like may occur, it is not preferable that an additional amount of Cu is 2.2 mass %.

From the above description, when Ge is added to the basic composition of Sn—Cu—Ni—Bi, in the above described composition, it is preferable that an additional amount of Cu is 0.1 to 2.0 mass %.

Further, hereinafter, with regard to the case in which Ge is added to the basic composition of Sn—Cu—Ni—Bi, a change in the tensile strength resulting from a change in an additional amount of Ni will be described in detail.

In this case, Cu, Bi, and Ge are included in an amount of 0.7 mass %, 1.5 mass %, and 0.006 mass %, respectively, further, Ni is added in an amount of 0.005 to 0.55 mass %, and the remainder is Sn. Hereinafter, for convenience of explanation, a sample in which 0.005 mass % of Ni is added, a sample in which 0.01 mass % of Ni is added, a sample in which 0.05 mass % of Ni is added, a sample in which 0.5 mass % of Ni is added, and a sample in which 0.55 mass % of Ni is added will be referred to as "0.005Ni," "0.01Ni," "0.05Ni," "0.5Ni," and "0.55Ni," respectively.

The samples were prepared by the above described method and the aging processing was performed on the prepared samples at 150° C. for 0 hours and 500 hours, and the tensile strength thereof was measured by the above described method.

TABLE 7

| A (0 HOURS) | SAMPLE NAME | 0.005Ni | 0.01Ni | 0.05Ni | 0.5Ni | 0.55Ni |
|---|---|---|---|---|---|---|
| | MEASUREMENT RESULT (Mpa) | 52.7 | 51.5 | 51.6 | 55.5 | 56.1 |
| C (500 HOURS) | SAMPLE NAME | 0.005Ni | 0.01Ni | 0.05Ni | 0.5Ni | 0.55Ni |
| | MEASUREMENT RESULT (Mpa) | 50.7 | 50.7 | 52.7 | 56.5 | 55.1 |
| STRENGTH CHANGE RATE (C/A) | (%) | 96% | 98% | 102% | 102% | 98% |

Figure 5:
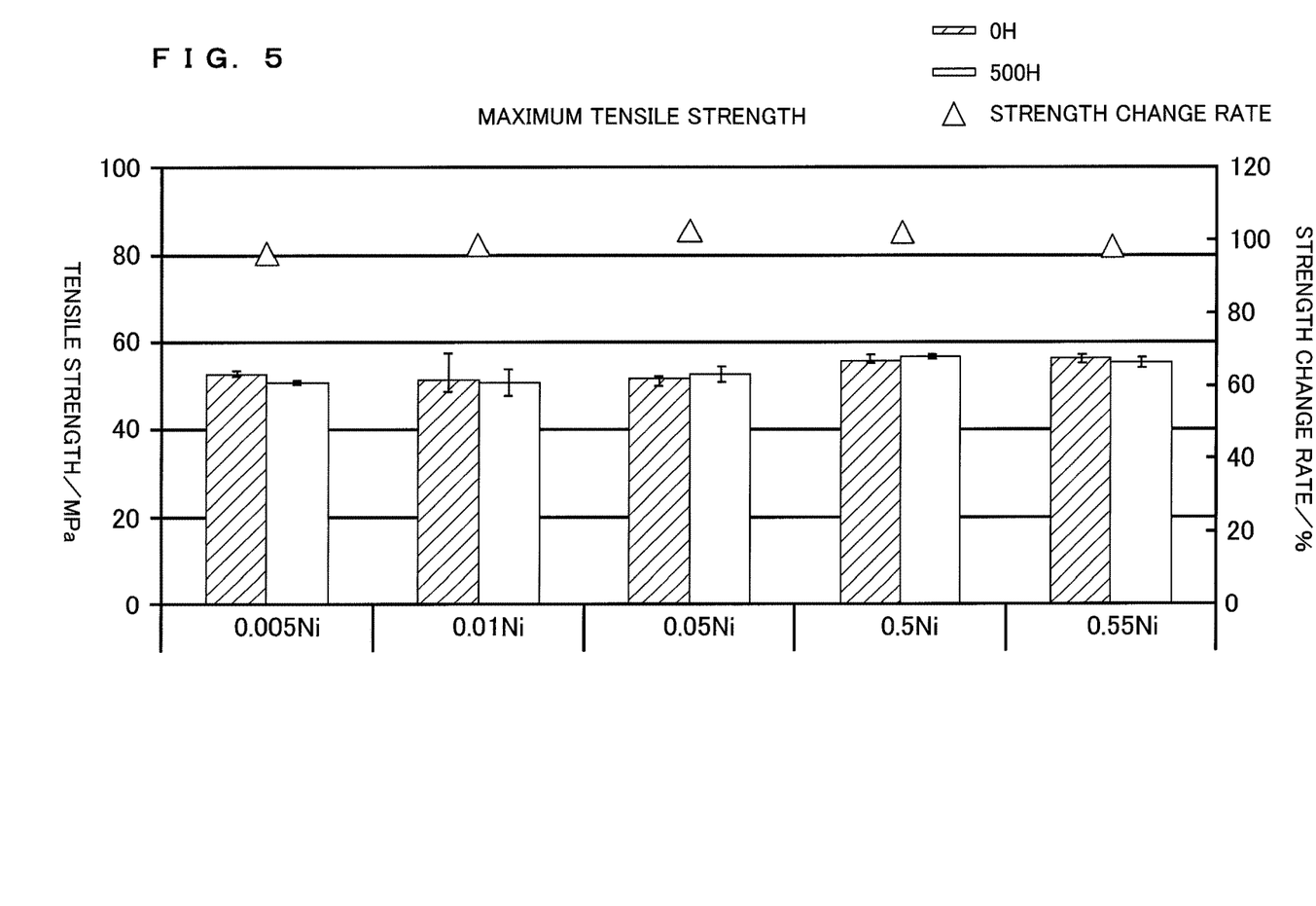
FIG. 5 is a graph summarizing measurement results of tensile strength of samples having different additional amounts of Ni.

Table 7 is a table showing measurement results of the tensile strength of the samples having different additional amounts of Ni as described above. "A" of Table 7 is a measurement result of the tensile strength after the aging for 0 hours, and "C" of Table 7 is a measurement result of the tensile strength after the aging for 500 hours. Further, FIG. 5 is a graph summarizing the measurement results of the tensile strength of the samples having different additional amounts of Ni.

All of "0.005Ni" to "0.55Ni" have a desirable strength change rate higher than 90% before and after the aging. However, it is not preferable that the additional amount of Ni is small since an effect of suppressing coarsening of an intermetallic compound at an interface of alloy layers may be lost so as to cause cracks. Meanwhile, it is not preferable that an additional amount of Ni exceeds 0.5 mass %, since the liquid phase temperature may rise to cause an occurrence of shrinkage cavity.

From the above description, when Ge is added to the basic composition of Sn—Cu—Ni—Bi, in the above described composition, it is preferable that an additional amount of Ni is 0.01 to 0.5 mass %.

Further, hereinafter, with regard to the case in which Ge is added to the basic composition of Sn—Cu—Ni—Bi, a change in the tensile strength resulting from a change in an additional amount of Ge will be described in detail.

In this case, Cu, Ni, and Bi are included in an amount of 0.7 mass %, 0.05 mass %, and 1.5 mass %, respectively. Further, Ge is added in an amount of 0.0001 to 1 mass %, and the remainder is Sn. Hereinafter, for convenience of explanation, a sample in which 0.0001 mass % of Ge is added, a sample in which 0.001 mass % of Ge is added, a sample in which 0.006 mass % of Ge is added, a sample in which 0.1 mass % of Ge is added, and a sample in which 1 mass % of Ge is added will be referred to as "0.0001Ge," "0.001Ge," "0.006Ge," "0.1Ge," and "1Ge," respectively.

The samples were prepared by the above described method and the aging processing was performed on the prepared samples at 150° C. for 0 hours and 500 hours, and the tensile strength thereof was measured by the above described method.

TABLE 8

| A (0 HOURS) | SAMPLE NAME | 0.0001Ge | 0.001Ge | 0.006Ge | 0.1Ge | 1Ge |
|---|---|---|---|---|---|---|
| | MEASUREMENT RESULT (Mpa) | 52.4 | 52.7 | 51.6 | 59.0 | 79.4 |
| C (500 HOURS) | SAMPLE NAME | 0.0001Ge | 0.001Ge | 0.006Ge | 0.1Ge | 1Ge |
| | MEASUREMENT RESULT (Mpa) | 50.7 | 51.5 | 52.7 | 52.9 | 55.3 |
| STRENGTH CHANGE RATE (C/A) | (%) | 97% | 98% | 102% | 90% | 70% |

Figure 6:
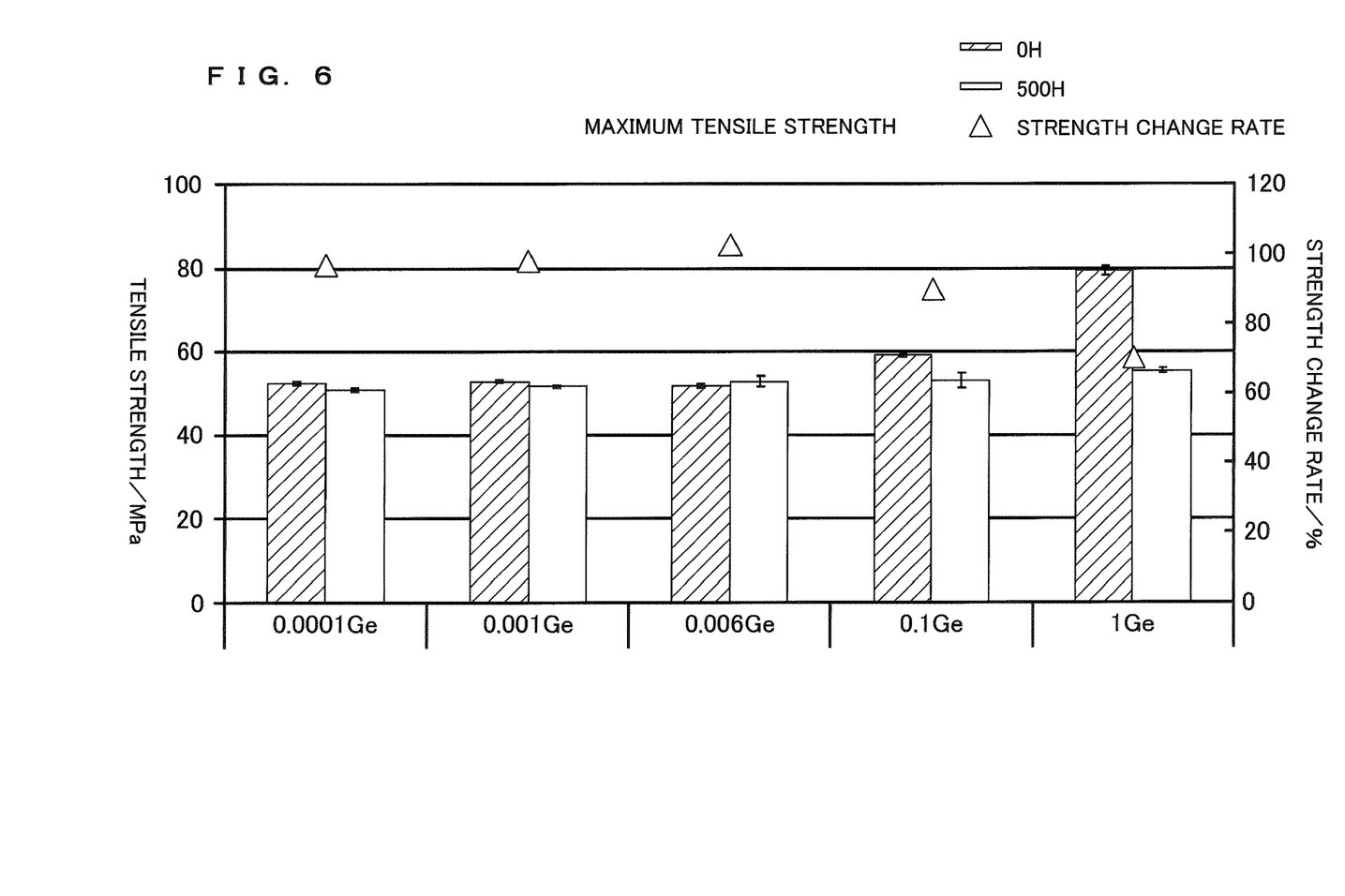
FIG. 6 is a graph summarizing measurement results of tensile strength of samples having different additional amounts of Ge.

Table 8 is a table showing measurement results of the tensile strength of the samples having different additional amounts of Ge as described above. "A" of Table 8 is a measurement result of the tensile strength after the aging for 0 hours, and "C" of Table 8 is a measurement result of the tensile strength after the aging for 500 hours. Further, FIG. 6 is a graph summarizing the measurement results of the tensile strength of the samples having different additional amounts of Ge.

All of "0.0001Ge" to "0.1Ge" have a desirable strength change rate higher than 90% before and after the aging. However, it is not preferable that an additional amount of Ge is 0.0001 mass %, since an effect of preventing oxidation may be suppressed. Meanwhile, when an additional amount of Ge is 1 mass %, the strength change rate before and after the aging is much lower than 90%.

From the above description, when Ge is added to the basic composition of Sn—Cu—Ni—Bi, in the above described composition, it is preferable that an additional amount of Ge is 0.001 to 0.1 mass %.

Meanwhile, since it is expected that the effect of preventing oxidation is improved as the additional amount of Ge is increased, an additional amount of Ge may also be 0.001 to 1.0 mass %.

Further, hereinafter, with regard to the case in which In is added to the basic composition of Sn—Cu—Ni—Bi, a change in the tensile strength resulting from a change in an additional amount of In will be described in detail.

In this case, Cu, Ni, Bi and Ge are included in an amount of 0.7 mass %, 0.05 mass %, 1.5 mass %, and 0.006 mass %, respectively. Further, In is added in an amount of 0 to 10 mass %, and the remainder is Sn. Hereinafter, for convenience of explanation, a sample in which 0 mass % of In is added, a sample in which 0.1 mass % of In is added, a sample in which 3 mass % of In is added, a sample in which 4 mass % of In is added, a sample in which 5 mass % of In is added, a sample in which 6 mass % of In is added, a sample in which 7 mass % of In is added, and a sample in which 10 mass % of In is added will be referred to as "0In," "0.1In," "3In," "4In," "5In," "6In," "7In," and "10In," respectively.

The samples were prepared by the above described method and the aging processing was performed on the prepared samples at 150° C. for 0 hours and 500 hours, and the tensile strength thereof was measured by the above described method.

TABLE 9

| | | 0In | 0.1In | 3In | 4In | 5In | 6In | 7In | 10In |
|---|---|---|---|---|---|---|---|---|---|
| A (0 HOURS) | SAMPLE NAME | 0In | 0.1In | 3In | 4In | 5In | 6In | 7In | 10In |
| | MEASUREMENT RESULT (Mpa) | 51.6 | 51.4 | 56.7 | 57.9 | 62.0 | 66.1 | 67.5 | 67.3 |
| C (500 HOURS) | SAMPLE NAME | 0In | 0.1In | 3In | 4In | 5In | 6In | 7In | 10In |
| | MEASUREMENT RESULT (Mpa) | 52.7 | 51.4 | 58.7 | 60.4 | 67 | 73.5 | 74.4 | 48.8 |
| STRENGTH CHANGE RATE (C/A) | (%) | 102% | 100% | 104% | 104% | 108% | 111% | 110% | 73% |

Figure 7:
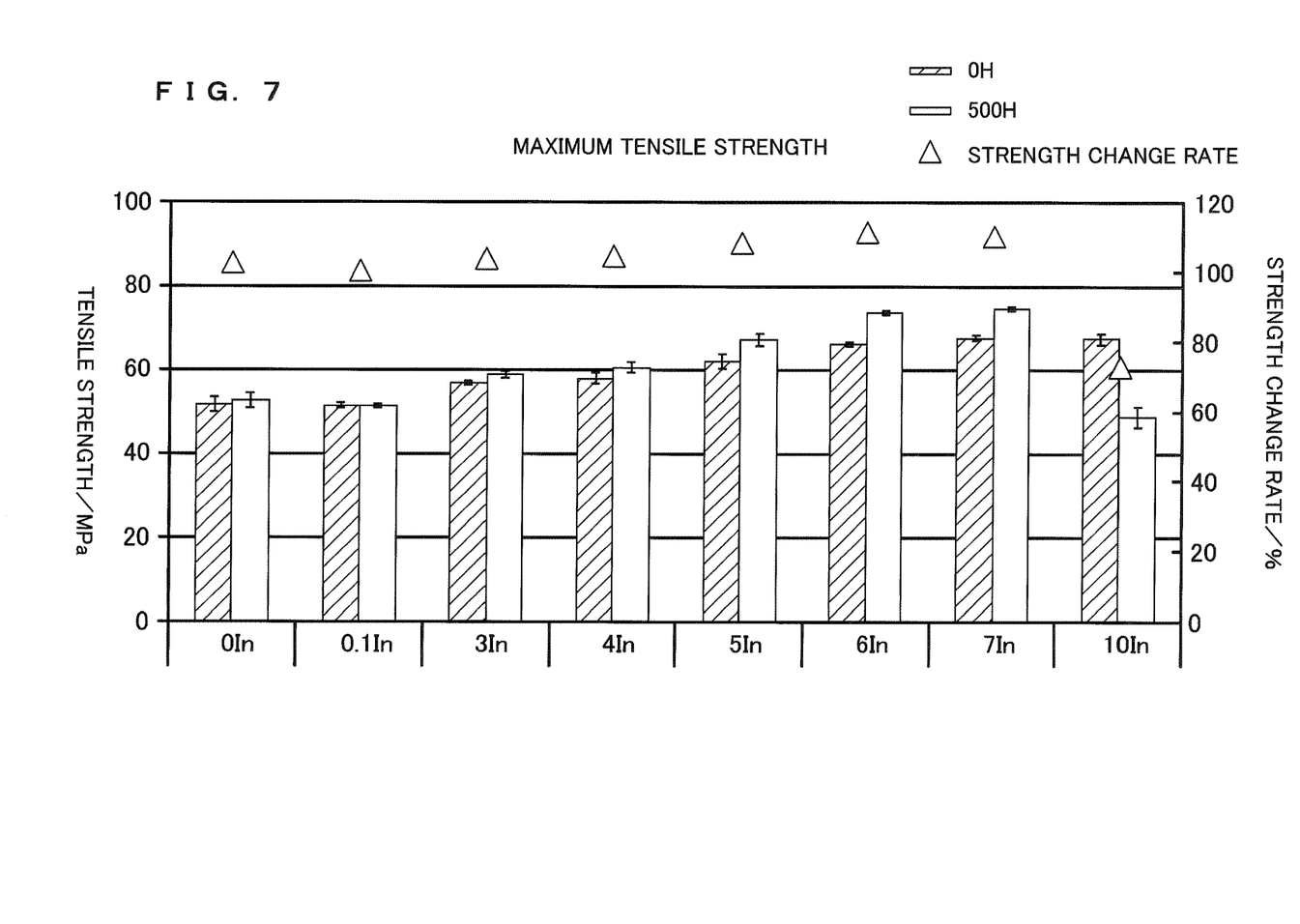

Table 9 is a table showing measurement results of the tensile strength of the samples having different additional amounts of In (hereinafter, simply referred to as In-changed sample) as described above. "A" of Table 9 is a measurement result of the tensile strength after the aging for 0 hours, and "C" of Table 9 is a measurement result of the tensile strength after the aging for 500 hours. Further, FIG. 7 is a graph summarizing the measurement results of the tensile strength of the samples having different additional amounts of In.

All of the In-changed samples except for "10In" have a desirable strength change rate higher than 90% before and after the aging. Accordingly, it may also be considered that it is effective that the additional amount of In is 0.1 to 7 mass %.

Figure 8:
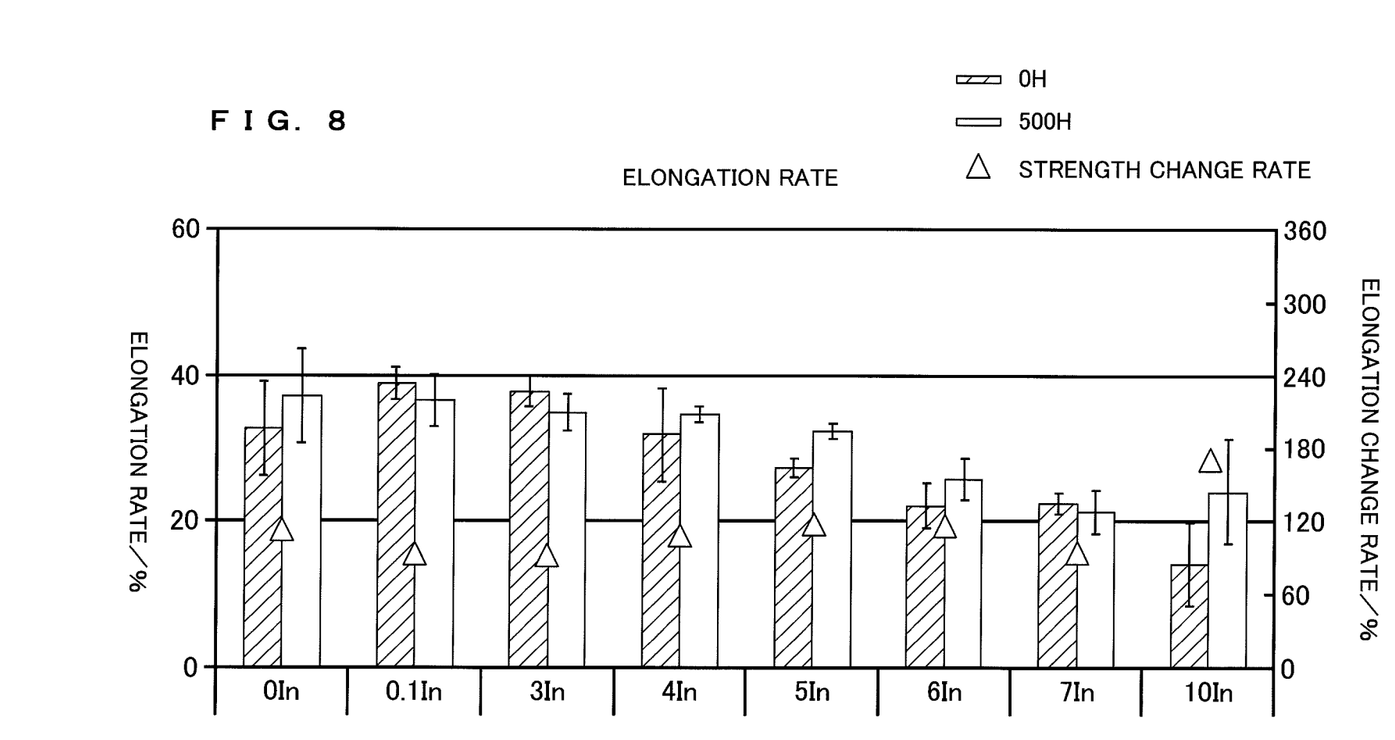
FIG. 8 is a graph summarizing measurement results of elongation rate of In-changed samples.

Meanwhile, Table 10 is a table showing measurement results of elongation rate of the In-changed samples. "A" of Table 10 is a measurement result of elongation rate after the aging for 0 hours, and "C" of Table 10 is a measurement result of elongation rate after the aging for 500 hours, and the elongation change rate is a result showing a change in elongation rate after the aging for 500 hours, in percentage (%). Further, FIG. 8 is a graph summarizing the measurement results of the elongation rate of the above-described In-changed samples.

TABLE 10

| | | 0In | 0.1In | 3In | 4In | 5In | 6In | 7In | 10In |
|---|---|---|---|---|---|---|---|---|---|
| A (0 HOURS) | SAMPLE NAME | 0In | 0.1In | 3In | 4In | 5In | 6In | 7In | 10In |
| | MEASUREMENT RESULT (Mpa) | 33 | 39 | 38 | 32 | 27 | 22 | 22 | 14 |
| C (500 HOURS) | SAMPLE NAME | 0In | 0.1In | 3In | 4In | 5In | 6In | 7In | 10In |
| | MEASUREMENT RESULT (%) | 37 | 37 | 35 | 35 | 32 | 26 | 21 | 24 |
| STRENGTH CHANGE RATE (C/A) | (%) | | 112% | 95% | 92% | 109% | 119% | 118% | 95% | 171% |

Herein, the elongation rate may be obtained by the following equation. In the equation, "δ" represents elongation rate, "Lo" represents a length between gauge points before the tensile strength measurement, "L" is a length between the gauge points after the tensile strength measurement.

$$\delta(\%) = (L-Lo)/Lo \times 100$$

Further, the elongation rate was calculated using the above equation by marking a prescribed length (50 mm, Lo) between the gauge points on a test specimen before the tensile strength measurement, and measuring a length (L) between the gauge points at the time of matching fractured pieces of the test specimen after the tensile strength measurement.

As can be seen from Table 10 and FIG. 8, in a range in which the additional amount of In is 4 mass % (4In) to 6 mass % (6In), all of the samples have a stable elongation change rate higher than 100%. That is, in such a range, the elongation rate is improved after the aging.

In other words, in such a range, the transformation may more easily occur after the aging than before the aging. When an impact is applied from the outside, the impact is to be absorbed through the transformation and the strength increases to some degree overall. Therefore, such an improvement of the elongation rate may contribute to the improvement of the strength.

However, when the additional amount of In is excessively large, a temperature at which the transformation starts may be decreased.

From the above description, when In is added to the basic composition of Sn—Cu—Ni—Bi, in the above described composition, it is preferable that an additional amount of In is 0.1 to 6 mass %.

Meanwhile, since it is expected that as the additional amount of In is increased, the liquid phase temperature is decreased and the strength is increased, and therefore the additional amount of In may also be 0.1 to 10 mass %.

Hereinafter, a strength change of the "SAC305" sample including only Ag, Cu, and Sn without Ni, Ge, and Bi being added thereto, and samples with the basic composition of Sn—Cu—Ni—Bi in which Ge, Sb, In, Ga, P, Co, Al, Ti, or Ag (hereinafter, referred to as an additional element) is added, will be described below.

TABLE 12

|  | Ge | Sb | In | Ga | P | Co | Al | Ti | Ag |
|---|---|---|---|---|---|---|---|---|---|
| 0.001Ge (II) | 0.001 | 0 | 0 | 0 | 0 | 0 | 0 | 0 | 0 |
| 0.1Ge (III) | 0.1 | 0 | 0 | 0 | 0 | 0 | 0 | 0 | 0 |
| 0.1Sb (IV) | 0.006 | 0.1 | 0 | 0 | 0 | 0 | 0 | 0 | 0 |
| 5Sb (V) | 0.006 | 5 | 0 | 0 | 0 | 0 | 0 | 0 | 0 |
| 0.1In (VI) | 0.006 | 0 | 0.1 | 0 | 0 | 0 | 0 | 0 | 0 |
| 10In (VII) | 0.006 | 0 | 10 | 0 | 0 | 0 | 0 | 0 | 0 |
| 0.001Ga (VIII) | 0.006 | 0 | 0 | 0.001 | 0 | 0 | 0 | 0 | 0 |
| 1Ga (IX) | 0.006 | 0 | 0 | 1 | 0 | 0 | 0 | 0 | 0 |
| 0.005P (X) | 0.006 | 0 | 0 | 0 | 0.005 | 0 | 0 | 0 | 0 |
| 0.05Co (XI) | 0.006 | 0 | 0 | 0 | 0 | 0.05 | 0 | 0 | 0 |
| 0.01Al (XII) | 0.006 | 0 | 0 | 0 | 0 | 0 | 0.01 | 0 | 0 |
| 0.005Ti (XIII) | 0.006 | 0 | 0 | 0 | 0 | 0 | 0 | 0.005 | 0 |
| 1Ag (XIV) | 0.006 | 0 | 0 | 0 | 0 | 0 | 0 | 0 | 1 |

Unit: Mass %

TABLE 11

| | SAMPLE No. | | I | II | III | IV | V | VI |
|---|---|---|---|---|---|---|---|---|
| A (0 HOURS) | SAMPLE NAME | SAC305 48.2 | +1.5Bi | 0.001Ge | 0.1Ge | 0.1Sb | 5Sb | 0.1In |
| | MEASUREMENT RESULT | (Mpa) | 51.6 | 52.7 | 59.0 | 52.6 | 64.6 | 51.4 |
| C (500 HOURS) | SAMPLE NAME | 5AC305 | +1.5Bi | 0.001Ge | 0.1Ge | 0.1Sb | 5Sb | 0.1In |
| | MEASUREMENT RESULT | 35.6 (Mpa) | 52.7 | 51.5 | 52.9 | 52.2 | 64.4 | 51.4 |
| STRENGTH CHANGE RATE (C/A) | (%) | | 74% | 102% | 98% | 90% | 99% | 100% | 100% |

| VII | VIII | IX | X | XI | XII | XIII |
|---|---|---|---|---|---|---|
| 10In | 0.001Ga | 1Ga | 0.005P | 0.05Co | 0.01Al | 0.005Ti |
| 67.3 | 50.6 | 62.5 | 50.7 | 50.4 | 49.9 | 52.4 |
| 10In | 0.001Ga | 1Ga | 0.005P | 0.05Co | 0.01Al | 0.005Ti |
| 48.8 | 51.6 | 71.8 | 53.3 | 54.0 | 51.1 | 54.2 |
| 73% | 102% | 115% | 105% | 107% | 104% | 103% |

Figure 9:
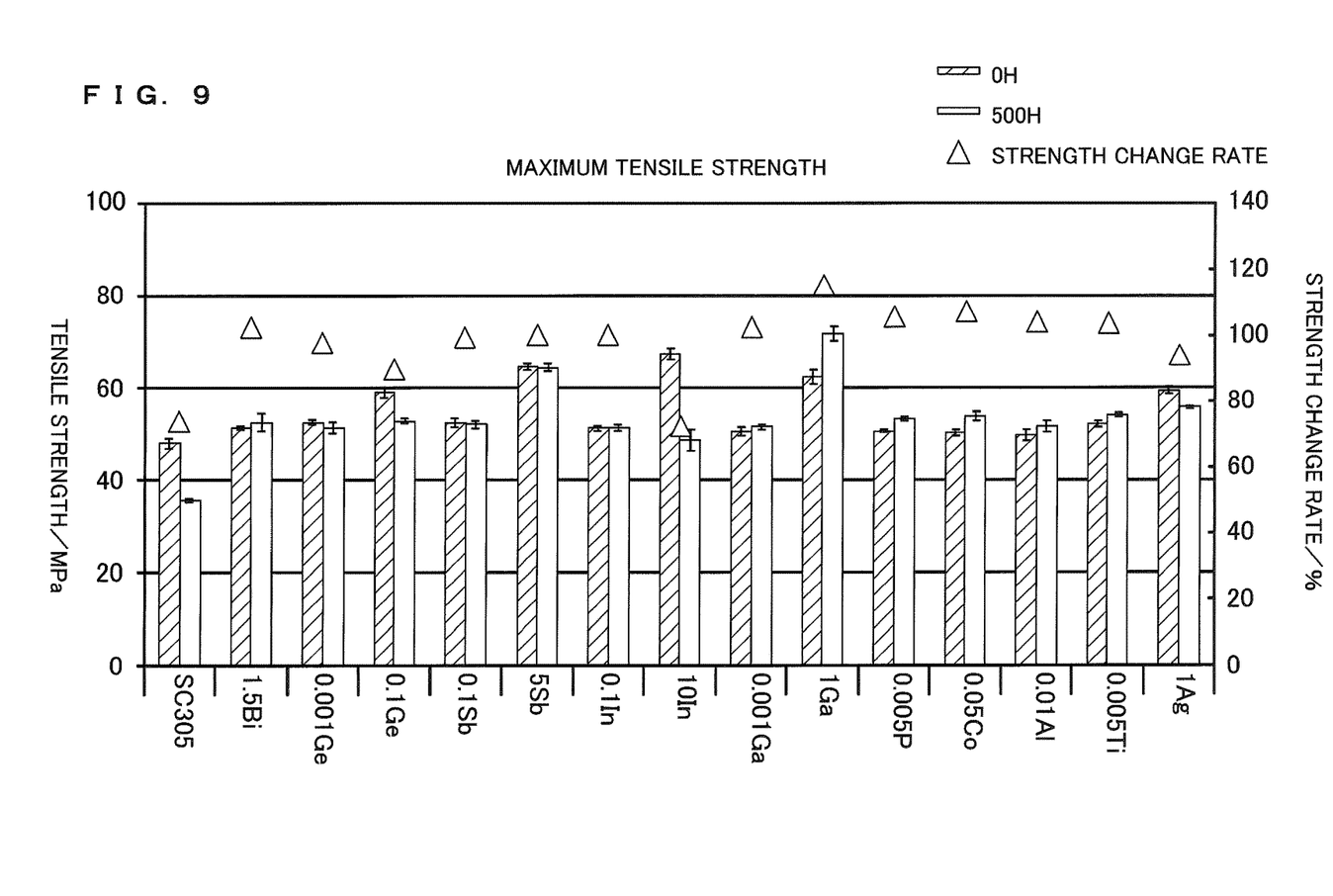
FIG. 9 is a graph summarizing measurement results of tensile strength of samples in which an additional element is added.

Table 11 is a table showing measurement results of the tensile strength of the samples in which the additional element is added. "A" of Table 11 is a measurement result of the tensile strength after the aging for 0 hours, and "C" of Table 11 is a measurement result of the tensile strength after the aging for 500 hours. Further, FIG. 9 is a graph summarizing the measurement results of the tensile strength of the samples in which the additional element is added.

Further, a composition of the samples in which the additional element is added is shown in Table 12. Here, since "SAC305" has the same composition as that of "SAC305" (produced by Nihon Superior Co., Ltd.) in Table 4 above, and the composition of "+1.5Bi" (I) has been already shown in Table 2, the compositions thereof will not be represented in detail.

In all of Samples II to XIV shown in Tables 11 and 12, Cu, Ni and Bi are included in an amount of 0.7 mass %, 0.05 mass %, and 1.5 mass %, respectively. Hereinafter, for convenience of explanation, the content of Cu, Ni, and Bi as described above will be referred to as a basic composition.

Further, in Samples II and III, Ge is further included in an amount of 0.001 mass % or 0.1 mass %, respectively, in addition to the above-described basic composition, and the remainder is Sn. In addition, Samples IV to XIV contain 0.006 mass % of Ge together with the above-described basic composition, and further contain the additional elements.

As can be seen from FIG. 9 and Table 11, only "SAC305" and "10In" (VII) have a strength change rate lower than 90% before and after the aging. That is, it is determined that, except for Sample VII, the additional element and the corresponding additional amount to each sample maintain the effects of the present invention, that is the effect of improving reliability after the aging (improving tensile strength), while bringing unique effects due to the additional elements.

For example, Ge and P have a unique effect of preventing oxidation of Sn and solder ingredients due to oxide films. Ti and Ga have unique effects of self-oxidation and increasing bulk strength. In has unique effects of decreasing liquid phase temperature and increasing strength, and Ag has a unique effect of increasing the strength before the aging by dispersion and precipitation strengthening. Co has a unique effect of thinning an intermetallic compound layer, and Al has unique effects of refining the intermetallic compound, suppressing a decrease in the strength after the aging, and self-oxidation.

Table 13 is a table showing comparisons between the tensile strength of "SAC305" and the tensile strength of Samples I to XIV before and after the aging. More specifically, Table 13 shows ratios of the tensile strength of Samples I to XIV to the tensile strength of "SAC305," and ratios of the tensile strength of "SAC305" and Samples II to XIV to the tensile strength of Sample I, in percentage (%). In other words, Table 13 shows relative tensile strength with respect to "SAC305" and Sample I before and after the aging.

TABLE 13

| | BEFORE AGING | | AFTER AGING | |
|---|---|---|---|---|
| Alloy | COMPARISON WITH SAC305 | COMPARISON WITH SN1 + 1.5Bi | COMPARISON WITH SAC305 | COMPARISON WITH SN1 + 1.5Bi |
| SAC305 | 100 | 93 | 100 | 67 |
| 1.5Bi | 107 | 100 | 148 | 100 |
| 0.001Ge | 109 | 102 | 145 | 98 |
| 0.1Ge | 123 | 115 | 149 | 100 |
| 0.1Sb | 109 | 102 | 147 | 99 |
| 5Sb | 134 | 125 | 181 | 122 |
| 0.1In | 107 | 100 | 144 | 97 |
| 10In | 140 | 131 | 137 | 93 |
| 0.001Ga | 105 | 98 | 145 | 98 |
| 1Ga | 130 | 121 | 202 | 136 |
| 0.005P | 105 | 98 | 150 | 101 |
| 0.05Co | 105 | 98 | 152 | 102 |
| 0.01Al | 104 | 97 | 146 | 98 |
| 0.005Ti | 109 | 102 | 152 | 103 |
| 1Ag | 124 | 116 | 157 | 106 |

Unit: Mass %

As can be seen from Table 13, all of Samples II to XIV have a relative tensile strength of 93% or more in both of before and after the aging, in particular, Samples V and IX have a relative tensile strength exceeding 120% in both of before and after the aging. From the results as described above, it is also determined that in the case of adding the above-described additional elements, the effects of the present invention may be maintained, and the unique effects of the additional elements may also be obtained, as described above.

If it is within the range in which the effects of the present invention are obtained, a shape or a usage of the lead-free solder alloy of the present invention which has Sn—Cu—Ni—Bi as the basic composition is not limited, and the lead-free solder alloy may be used for flow soldering or reflow soldering. The lead-free solder alloy may have a shape such as a solder paste type, a resin flux cored solder type, a powder type, a preform type, and a ball type according to its use, as well as a bar type for flow soldering.

Further, the present invention is also directed to the soldered joint which is soldered with the lead-free solder alloy of the present invention being processed to have various shapes.

INDUSTRIAL APPLICABILITY

The present invention is a lead-free solder alloy having versatility so as not to be limited by a form of a solder product, and as the decrease of joining strength of the soldered joint is little even in a state of being exposed to high temperature for a long time, the excellent long-term reliability of the soldered joint is maintained. Accordingly, the present invention may be widely applied to apparatuses and devices having soldered joints in which high current flows, apparatuses and devices exposed to a high-temperature state, or the like, as well as soldering of electronic devices.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A lead-free solder alloy, consisting of:
   76.0 to 99.5 mass % of Sn;
   0.1 to 1.0 mass % of Cu;
   0.01 to 0.5 mass % of Ni;
   0.1 to less than 2.0 mass % of Bi;
   0.001 to less than 0.01 mass % of Ge; and
   unavoidable impurities,
   wherein the solder alloy does not contain Ag.

2. The lead-free solder alloy according to claim 1, wherein Cu is included in an amount of 0.1 to 0.7 mass %.

3. The lead-free solder alloy according to claim 1, wherein Ge is included in an amount of 0.001 to 0.006 mass %.

4. The lead-free solder alloy according to claim 1, wherein Ge is included in an amount of 0.001 to 0.002 mass %.

5. The lead-free solder alloy according to claim 1, wherein Ni is included in an amount of 0.3 to 0.5 mass %.

6. A soldered joint using the lead-free solder alloy according to claim 1.

* * * * *